July 15, 1952　　　G. R. MELLINGER　　　2,603,436
BALANCED CONTROL SURFACE
Filed March 18, 1947
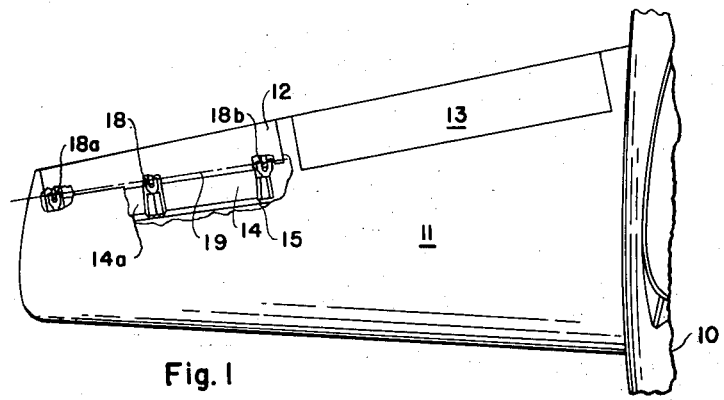
Fig. 1
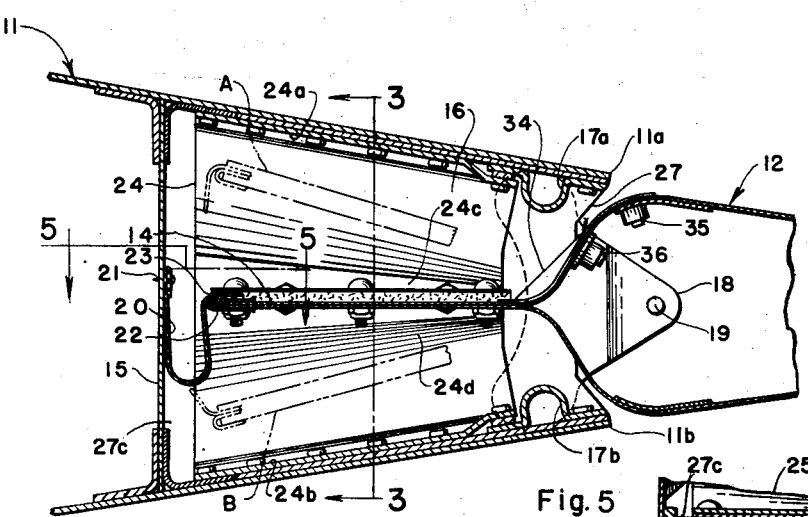
Fig. 2
Fig. 5
Fig. 4
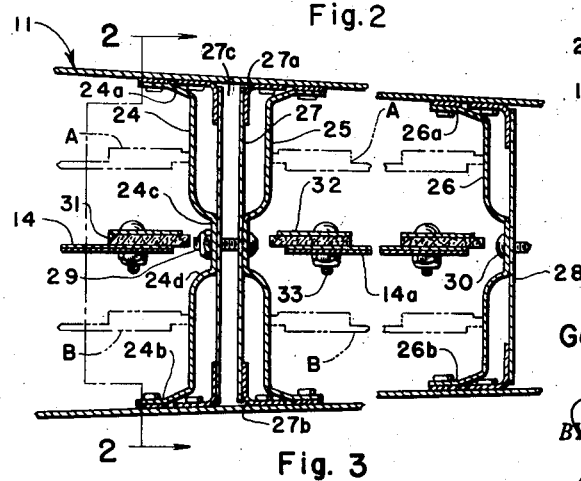
Fig. 3
George R. Mellinger
*INVENTOR.*
BY James M. Clark
HIS PATENT ATTORNEY Patented July 15, 1952

2,603,436

UNITED STATES PATENT OFFICE 2,603,436

BALANCED CONTROL SURFACE

George R. Mellinger, Los Angeles, Calif., assignor to North American Aviation, Inc.

Application March 18, 1947, Serial No. 735,310

6 Claims. (Cl. 244—90)

The present invention relates broadly to control surfaces and more particularly to improvements in means for balancing such surfaces in aircraft and other vehicles.

It has long been known that, as a control surface is displaced from its neutral position, the control or pilot forces necessary to move the surface increase materially with the increase in the angle of displacement. Numerous means have been suggested and used for providing balancing forces in opposition to the aerodynamic forces to which the displaced surface is subjected. Among the most advantageous and successful of such balancing means is the internal pressure balance arrangement in which a seal is provided between the nose of the surface and the rear wall of the wing in order to take advantage of the pressures developed within the wing recess at each side of the seal. It will be appreciated that the need for such balanced surfaces is relatively great in aircraft of large size and high speed and the use of such internal pressure balances materially relieves the pilot, as well as the control system and actuating mechanism of considerable stress and strain.

The seals utilized in internal pressure balances for control surfaces are of several different types. A first of these might be referred to as the flexible "curtain" type and consists of a sheet of fabric or other flexible material attached to the fixed wing structure at one edge and to the movable control surface along its opposite edge. Another type of seal will be recognized as the sliding or wiping type and consists essentially of rubber, fabric or other pads attached to either the movable surface or the fixed wing, usually the former, and which maintain a wiping and sliding seal against the opposite member. The present invention relates to means for correcting or modifying the balancing effects of such seals and is adapted for use with either one or both of these types of pressure seals, as well as other types.

In the balancing of control surfaces, there are two principal variable forces, namely, the aerodynamic reaction force applied externally upon the exposed portions of the displaced control surface and the balancing force, (which is also aerodynamic in nature and origin,) which tends to assist in the rotation of the surface into its displaced position. In the event we disregard for the present purposes the friction of the surface mounting and that of the actuating mechanism, the control force or pilot force necessary to displace the surface into the airstream is substantially equivalent to the difference between the first two principal variable forces, namely the aerodynamic reaction force and the balance force. Inasmuch as each of these principal forces is subject to some variation under actual flight conditions of the airfoil and control surface, which due to manufacturing tolerances and variations are not always those for which they were designed, the pilot forces necessary to operate the surface frequently vary considerably and are not uniform in either magnitude or the degree of pilot "feel." The present invention is directed principally to the provision of means to correct this undesirable condition as by means of a by-pass or metering orifice which permits flow from one side of the seal to the other and in the desired amount and at the required positions of the surface as may be necessary to provide the proper pilot force and "feel."

It is accordingly a major object of the present invention to provide improved means for balancing control surfaces and overcoming the difficulties which they present. It is a further object to provide a simple and effective pressure balance by a by-pass or metering means for correcting over- or under-balanced surfaces. It is a further object to provide a variable orifice seal for an internal pressure balance for a control surface which can readily be applied to the wing to which the surface is pivoted in order to correct any conditions of under-balance or over-balance characteristics which the particular installation may have developed. It is also a purpose of the present invention to provide an improved variable orifice seal both in respect to its general arrangement, and its relationship to the adjacent parts, as well as in its specific details.

Other objects and advantages of the present invention will become apparent to those skilled in the art to which the present invention pertains after reading the present specification and the accompanying drawings, forming a part hereof, in which:

Figure 1 is a plan view of a wing of an airplane showing a control surface to which the present invention has been applied;

Figure 2 is an enlarged cross-sectional view of the trailing portion of the wing and the leading portion of the control surface shown in Figure 1;

Figure 3 is a sectional view taken along the line 3—3 of Figure 2;

Figure 4 is a detailed cross-sectional view of the fabric seal retaining means; and Figure 5 is a plan view as taken along the lines 5—5 of Figure 2 showing the seal and end plate at a corner of the balance means.

Referring now to Figure 1 there is shown a portion of the fuselage 10 of an airplane and the right wing or airfoil 11. The trailing edge of the wing is provided adjacent its outer portion with a control surface or aileron 12 to which the present invention has been applied, and inwardly of the aileron the wing is provided with a conventional flap or high lift device 13. The leading edge portion of the aileron 12 has a forwardly extending paddle or vane 14 which terminates just aft of the trailing edge spar 15 of the wing. The aileron 12 is preferably mounted to pivot at the hinge bracket 18a at its outer terminal, the intermediate hinge bracket 18, and the inboard hinge bracket 18b, the hinge pivot axis being designated by the numeral 19.

As may be more clearly seen in Figure 2, the upper and lower surfaces of the wing 11 extend aft of the web of the trailing edge spar 15, terminating at 11a and 11b at the upper and lower surfaces, respectively, to form a pressure chamber or recess 16. The wing trailing edges 11a and 11b are reinforced by the hat-shaped stiffener sections 17a and 17b, respectively, which also serves to reinforce the trailing edges in the region where the hinge brackets 18, 18a and 18b are attached. These hinge brackets are preferably supported between rearwardly extending rib sections, the central one of which, at the hinge bracket 18, divides the vane portion of the aileron balance into an inner portion 14 and an outer portion 14a.

At the leading edge of the vane portions 14 and 14a, and for the spanwise extent thereof, there is attached a fabric seal 20 of the curtain type, being attached to the spar web 15 by the attachment screws 21 at its forward edge and to the vane portions by the attachment clips 22 and the screw-attached retaining strip 23.

It will accordingly be seen that the vane portion 14, comprising a forward extension of the leading edge skin of the aileron 12, in conjunction with the fabric seal 20, provides a pressure type aileron balance by horizontally dividing the pressure chamber or recess 16. As the aileron is deflected clockwise downwardly, the vane portion 14 is rotated clockwise upwardly about the hinge axis 19 into an upper dotted line position as indicated at A, and in this position the pressure created on the under side of the wing 11 is increased within the portion of the pressure chamber beneath the vane 14, while at the same time the air pressure within the portion of the chamber above the vane is reduced. The pressure differential which is thus created in favor of the underside of the vane 14 is maintained by means of the curtain seal 20 and it exerts an upward or clockwise balance force which is opposite in direction to the counter-clockwise aerodynamic reaction force exerted by the airstream upon the exposed surface of the downwardly reflected aileron.

As indicated above, the pressure balance of such ailerons is usually designed in such manner that these opposing forces are substantially equal and opposite, or uniformly balanced, with due allowance made for the friction of the aileron hinge pivot and other of the aileron operating mechanism, such that the surface can be moved by the pilot with a minimum of pilot or control force which will supply sufficient "feel" upon the manual control. It has been the general practice previously to provide end seals of either the curtain or wiping type in order that the pressure differentials created by the deflected control surface, are maintained in a relatively air-tight manner within the divided portions of the pressure chamber.

In the example which has been selected for explanatory purposes in the present description, it has been assumed that the pilot or control forces are too light at small angles of deflection of the aileron and too heavy at larger angles of deflection with the usual fabric end seals. This condition of unequal distribution of control forces throughout the range of movement of the aileron or control surface is corrected by the improvement comprising the present invention. In the embodiment which has been shown in the drawings this improved means consists essentially of deformed end plates 24, 25 and 26 which provide a variable orifice to permit by-passing of the air from the high-pressure side of the vane 14 to the low pressure side to thereby reduce the balance force exerted upon the vane.

Referring more particularly to the end plate 24 as shown in Figures 2 and 3, it will be noted that the plate is stamped or formed such that it has an attachment flange 24a by means of which it may be riveted to the upper skin 11a, and a like attachment flange 24b riveted to the lower skin 11b. At its central portion adjacent the neutral position of the vane 14 and its end seal, the end plate 24 is provided with a depressed portion 24c with a rounded or filleted portion 24d merging into the remaining straight or flush portion of the end plate. The intermediate rib adjacent the central hinge bracket 18 is indicated by the numeral 27 and is provided with upper and lower flange portions 27a and 27b, respectively, by means of which it is attached to the upper and lower surfaces of the wing. A corresponding rib is indicated by the numeral 28, adjacent the outer hinge bracket 18a, and the end plates 24 and 25 are attached to the rib 27 by the bolts 29. The end plate 26 is similarly attached to the rib 28 by the bolts 30 engaging the end plates in their depressed portions. The end seals for the vanes 14 and 14a are preferably provided by felt strips 31 which are attached to the vanes by means of the retaining strip 32 and the screws 33. The depressed portion 24c and the rounded portion 24d are preferably segmental in shape as viewed in Figure 2 preferably tapering radially at their margins toward the axis 19 of the aileron hinge.

It will accordingly be noted that in the region of the neutral position of the aileron and its vane 14, a relatively large air leak or by-pass area is provided between the ends of the seals at the vane ends and the adjacent surfaces of the end plates 24, 25, 26, etc. This by-pass or leakage, by permitting flow from the high to the low pressure side of the chamber 16, serves to increase the amount of pilot or control force necessary to move the surface by virtue of the reduction in the magnitude of the balance forces provided by the reduced air pressure exerted upon the diaphragm or vane. As the aileron 12 may be downwardly rotated, such that the vane 14 reaches that portion of its movement in which it is adjacent to the rounded end plate portion 24d, the by-pass area is gradually decreased until at the larger angle, as indicated by the position A of the vane 14 both sides of the vane are again sealed by the seal-strips rubbing upon the end plates and the maximum pressure differential between the chamber portions is again restored.

The variable orifice plate 24 is constructed and arranged at its forward end as shown in Fig. 5, so as to provide a smooth transition from a maximum air leakage in the zero deflection or neutral position of the aileron to the minimum leakage position at a predetermined angle of aileron deflection. A relatively small gap or open area occurs at the corner adjacent the rear spar 15 between the plate 24 and the flexible diaphragm seal 20, the area of this gap forming a relatively small percentage of the horizontal area within which the balance paddle portion of the control surface operates. While this area produces some leakage, which if sealed over completely would give a small increase in the aileron stick forces at high angles of deflection, it is not considered that the improvement resulting from this complete sealing would justify the complexity of the seal required to close off this slight leakage. In the modification which has been illustrated, the variable orifice end plate 24 has only been carried as far forward as necessary to provide a rigid cooperating surface adjacent the end of the metal diaphragm or balance paddle 14. This metal diaphragm, forming the balance paddle, is terminated at its present position to provide sufficient clearance for the movement of the flexible diaphragm between the leading edge of the metal paddle diaphragm and the rear face of the spar 15. The edges of the ends of the balance paddle are in contact with the variable orifice plate 24 and the forward edge of the paddle connects to the flexible diaphragm seal. In other installations where it might be desirable, or necessary, to provide a more completely sealed installation, the orifice plate 24 could, of course, be extended forward to the spar 15 and the flexible seal 20 shaped accordingly. Adequate clearance, however, must be provided to permit unrestricted movement of the balance paddle during aileron deflection and the concurrent movement of the seal, and slight porting or venting between the two differential chambers has not materially affected the operation of the present aerodynamic balance in actual operation of full scale aircraft.

This substantially complete or minimum leakage seal thereby reduces the control forces necessary to displace the surface at the larger aileron angles and in addition tends to reduce the rate of change of force with air speed at the high aileron angles. In order that the pressure differential created within the recess is maintained at all other points than where it is deliberately by-passed by the orificed or indented end plates, a seal is provided by the fabric and leather boot 34 at the aileron hinge member. This seal is attached to a curved plate which conforms to the contour of the leading edge of the aileron, being attached thereto by the bolts 35 and 36. This leading plate serves to retain a section of the fabric which is provided with a pocket having a leather reinforcement which fits over the hinge member to thereby prevent leakage through the vane and the leading edge portion of the aileron.

It will accordingly be noted that there is shown and described herein simple and readily installed means for improving the operation of any pressure balanced aileron or other control surface either prior to its design and installation, or subsequent to obtaining the relationship of the force variation with the aileron angle of displacement. At those positions of the aileron where the pilot forces are too low, this condition is readily corrected by providing a by-pass or leak area at the end of the diaphragm. On the other hand where the pilot forces are too high at certain aileron angles, these conditions can be corrected by providing a complete end seal. The shape of the end plate is accordingly determined by the necessity for increase or reduction of control forces at any given angle throughout the entire range of the control surface movement.

Other forms and modifications of the present invention, both with respect to its general arrangement and the details of its individual parts which will become apparent to those skilled in the art as a result of the present disclosure, are intended to fall within the scope and spirit of this invention as more particularly set forth in the appended claims.

I claim:

1. In an airplane, the combination of: a fixed surface having a rearwardly located, rearwardly opening chamber therein communicating with the airstream and having a forward vertical wall; a control surface having a transverse hinge axis; brackets extending chordwise of said chamber and hingedly associating said control surface with said fixed surface, said control surface having a pressure-balance portion extending beyond its hinge axis into said chamber and sub-divided spanwise thereof; a correspondingly sectionalized pressure seal uniting said subdivisions with the vertical wall of said chamber; a substantially vertically extending baffle member disposed in adjacency with each edge of each subdivision that extends chordwise of each subdivision, each baffle member adjacent each side of each bracket being centrally warped oppositely towards said bracket and having the faces thereof that extend chordwise of said chamber warped on a compound, or reverse, curve, whereby to define vertically extending orifices between said baffle members and said subdivisions in the neutral position of said subdivisions; and means carried by each of the subdivision edges that extend chordwise of the subdivision for gradually closing said orifice as the control surface approaches its extreme deflection-positions.

2. An aircraft pressure balance control installation comprising an airfoil, a control surface movably mounted thereon, a recess formed by a transverse wall within the trailing portion of said airfoil, said control surface having a forwardly extending balance portion movable with said control surface and within said airfoil recess, seal means including a flexible curtain element extending from the front edge of said forwardly extending balanced portion of said control surface to the said transverse wall of said airfoil recess arranged to divide said recess into compartments of different pressures, and variable orifice means for controlling the airflow between said differential pressure compartments of said recess comprised of relatively movable elements, a first of said elements comprising a chordwise extending wall portion extending from said transverse wall rearwardly and defining an end wall of said recess, the other relatively movable element comprising the chordwise extending lateral edge of said forwardly projecting balance portion of said control surface, said end wall being deformed laterally in the spanwise direction such that a variable orifice is formed having its greatest opening in the region of the neutral position of said control surface and said orifice gradually becomes lesser in area as said surface is moved into either deflected position to thereby equalize and make uniform the pilot forces necessary to operate said control surface.

3. An internal pressure balance for a control surface comprising an airfoil, a control surface pivotally mounted thereon, a pressure chamber formed within said airfoil by a spanwise extending front wall and a pair of chordwise extending end walls, seal means extending between a front spanwise extending edge of said control surface and said spanwise extending front wall of said pressure chamber to effect pressure balancing of said surface, one of said end walls having a segmental shaped depressed portion deformed laterally in the spanwise direction and tapering radially toward the pivotal axis of said control surface defining with a lateral chordwise extending edge of said control surface a variable orifice means which is open in a neutral position of said control surface for equalization of pressures within said chamber and is progressively closable upon displacement of said control surface for providing an increase in said balance effect.

4. An aircraft pressure balance comprising an airfoil, a control surface pivotally mounted upon the trailing portion of said airfoil for angular movement with respect thereto, spanwise extending front wall means and chordwise extending end wall means fixedly carried by said airfoil defining a pressure recess in the said trailing portion of said airfoil, a forwardly extending vane carried by said control surface for movement within said pressure recess, seal means extending between a spanwise extending front edge of said vane and said spanwise extending front wall means to prevent equalization of pressure between the portions of said pressure recess defined by said forwardly extending vane, and by-pass means including a deformed portion of said chordwise extending end wall means defining with an adjacent edge of said vane an unsealed space of predetermined area between said vane and said deformed end plate arranged to be open in the neutral position of said control surface with respect to said airfoil and to become closed as said surface is deflected above or below said neutral position to thereby increase the pressure balancing effect as a function of the angular displacement of said control surface from its neutral position.

5. In an internal pressure balance for an airfoil including a control surface movably mounted thereon, a pressure chamber formed within said airfoil, defined by spanwise extending front and chordwise extending end wall portions, balance means carried by said control surface for movement within said pressure chamber, seal means extending between said spanwise extending front wall portion and the forward edge of said balance means for preventing airflow from passing between said pressure chamber portions, the improvement of an offset chordwise extending end wall portion forming a part of said chamber-forming wall portions, said offset wall portion being spaced from said balance means in the neutral position of said control surface arranged to provide an orifice between said offset wall portion and said balance means and the neutral position of said control surface for equalization of the pressures within said pressure chamber on each side of said balance means, said offset wall portion formed in such manner that it is in sealing contact by said balance means in positions of said control surface which are angularly displaced from said neutral position for the aerodynamic balancing of said control surface.

6. In an airplane, the combination of; a fixed surface having a transverse interior wall defining a rearwardly opening chamber formed within the trailing portion of said fixed surface in communication with the airstream; a control surface having a spanwise extending hinge axis; bracket means extending chordwise of said chamber and hingedly associating said control surface at said hinge axis with said fixed surface; said control surface having a pressure-balance portion extending forwardly beyond this hinge axis into said chamber and sub-divided spanwise thereof; a correspondingly spanwise sectionalized pressure seal uniting said subdivisions with the transverse wall of said chamber; a chordwise extending baffle member disposed in adjaceny with each edge of each said subdivision; each baffle member adjacent each side of each bracket means being centrally warped oppositely towards said bracket means and having the faces thereof which extend chordwise of said chamber warped on a compound curve whereby to define orifices normal to the plane of the pressure balance portion of said control surface, said orifices extending between said baffle members and said subdivisions in the neutral position of said control surface; and means carried by each of the control surface edges which extend chordwise of the subdivision for gradually closing said orifice as the control surface approaches its extreme deflection-positions.

GEORGE R. MELLINGER.

REFERENCES CITED

The following references are of record in the file of this patent:

FOREIGN PATENTS

| Number | Country | Date |
| --- | --- | --- |
| 491,538 | Great Britain | Feb. 26, 1938 |